(12) United States Patent
Guo et al.

(10) Patent No.: US 10,944,724 B2
(45) Date of Patent: Mar. 9, 2021

(54) ACCELERATING COMPUTER NETWORK POLICY SEARCH

(71) Applicant: Fortinet, Inc., Sunnyvale, CA (US)

(72) Inventors: Zhi Guo, San Jose, CA (US); Xu Zhou, San Jose, CA (US); Yujiao Zheng, San Jose, CA (US); John A. Cortes, Santa Clara, CA (US)

(73) Assignee: Fortinet, Inc., Sunnyale, CA (US)

( * ) Notice: Subject to any disclaimer, the term of this patent is extended or adjusted under 35 U.S.C. 154(b) by 212 days.

(21) Appl. No.: 15/938,535

(22) Filed: Mar. 28, 2018

(65) Prior Publication Data

US 2019/0306118 A1 Oct. 3, 2019

(51) Int. Cl.
*H04L 29/06* (2006.01)
*H04L 12/813* (2013.01)
*H04L 12/727* (2013.01)

(52) U.S. Cl.
CPC ........ *H04L 63/0263* (2013.01); *H04L 45/121* (2013.01); *H04L 47/20* (2013.01); *H04L 69/22* (2013.01)

(58) Field of Classification Search
CPC ..... H04L 63/0263; H04L 47/20; H04L 69/22; H04L 45/121; H04L 43/028; H04L 43/18; H04L 41/00
See application file for complete search history.

(56) References Cited

U.S. PATENT DOCUMENTS

| | | | |
|---|---|---|---|
| 6,587,466 B1* | 7/2003 | Bhattacharya | H04L 41/0893 370/395.21 |
| 7,624,436 B2* | 11/2009 | Balakrishnan | H04L 63/0245 726/11 |
| 9,098,601 B2* | 8/2015 | Wang | G06F 16/90339 |
| 9,100,319 B2 | 8/2015 | Guo et al. | |
| 9,491,143 B2 | 11/2016 | Guo et al. | |
| 9,736,115 B2* | 8/2017 | Davis, Jr. | H04L 63/0245 |
| 2002/0143955 A1* | 10/2002 | Shimada | H04L 29/06 709/227 |
| 2014/0177634 A1* | 6/2014 | Jiang | H04L 45/64 370/392 |
| 2016/0094517 A1* | 3/2016 | Kang | H04L 63/0236 726/1 |
| 2019/0308646 A1* | 10/2019 | Kafzan | B61L 15/0018 |

* cited by examiner

*Primary Examiner* — Christopher A Revak
(74) *Attorney, Agent, or Firm* — Jaffery Watson Mendonsa & Hamilton LLP

(57) ABSTRACT

Systems and methods for accelerating computer network policy searching are provided. According to one embodiment, a packet is received by a policy search engine (PSE) of a packet processing device. A set of candidate policies are identified from among multiple policies of the packet processing device by screening the multiple policies by a speculation unit of the PSE based on metadata associated with the received packet. Finally, a matching policy for the received packet is identified by a policy search processor (PSP) of the PSE by executing policy-search-specific instructions and general purpose instructions.

18 Claims, 20 Drawing Sheets

| Field | Bit Size | Description |
|---|---|---|
| Byte Mask | 45 | 21 Bits for IPv4, while 45 bits for IPv6. Each Bit Being One Means the Corresponding Byte Needs to be Streamed into the DFA Engine |
| Nid | 25 | Root Node Address |

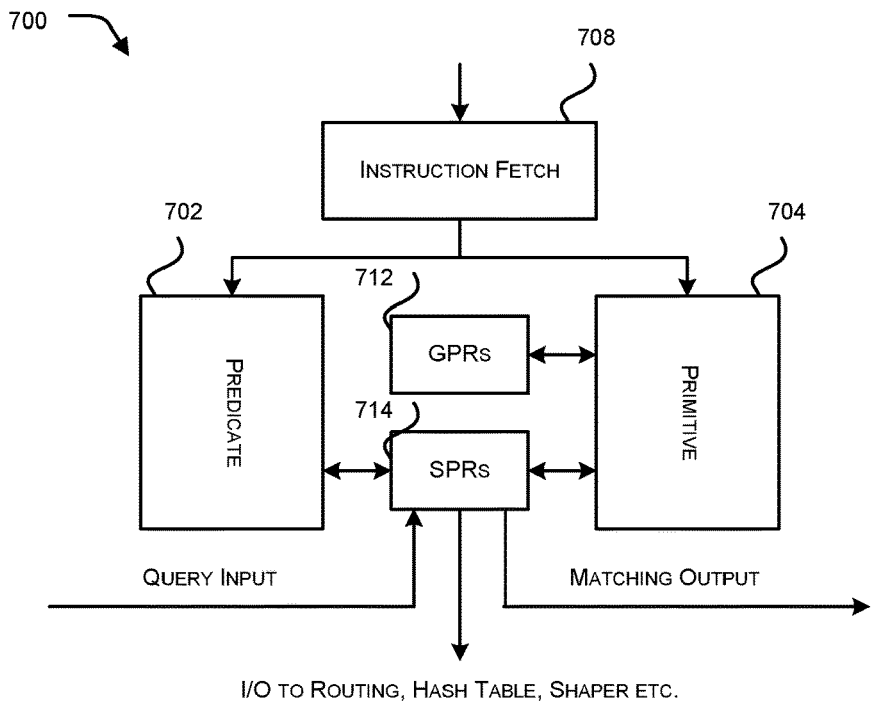

FIG. 7A

| Instruction | Description |
|---|---|
| ERC | Even Range Comparison |
| BMC | Bitmap Count |
| ECSFEQ | Set Flag if Element Equal to Immediate |
| ECSFNEQ | Set Flag if Element not Equal to Immediate |
| ECSFGEU | Set Flag if Element Greater than or Equal to Unsigned to Immediate |
| ECSFGTU | Set Flag if Element Greater than Unsigned to Immediate |
| ECOB | Element Compare OR, Branch if Matches |
| CASE | Branch Based on the Value of a General Purpose Register |

FIG. 7B

| SPR Name | Bit Size | Description |
|---|---|---|
| ERC Result | 5 | The ERC instruction's result. This register's binary value (0 through 31) is the matched outgoing edge. If the comparison is out of range, an ERC_VLD flag is cleared to 0. If the comparison is within range, the ERC_VLDflag is set to 1 |
| BMC Result | 6 | The BMC instruction's result: Bit[5]:1: the ERC_VLD flag is 0, 0: the ERC_VLD flag is 1; Bits[4:0]:if the ERC_VLD flag is 1, this field is the number of ones of BMC's bitmap[ERC_output-1:0] |

FIG. 7C

| POLICIES - 1102 ||||||||
|---|---|---|---|---|---|---|
| # | SOURCE_INTERFACE | TARGET_INTERFACE | SIP | DIP | PROTOCOL | DPORT |
| P0 | 10 | WILDCARD | 192.168.1.160/28 | 173.31.1.0/24 | TCP | 53 |
| P1 | 10 | WILDCARD | 192.168.1.176/28 | 173.31.1.0/24 | TCP | 53 |
| P2 | 10 | WILDCARD | 192.168.3.0/24 | 10.0.100.0/24 | TCP | 53 |
| P3 | 10 | WILDCARD | 192.168.3.0/24 | 173.16.0.0/16 | UDP | 520 |

| PACKET: (EXPECTED TO MATCH P0) - 1104 |||||||
|---|---|---|---|---|---|---|
| # | SOURCE_INTERFACE | TARGET_INTERFACE | SIP | DIP | SPORT | DPORT | PROTOCOL |
|   | 10 | 200 | 192.168.1.165 | 173.31.1.100 | 40440 | 53 | TCP |

FIG. 11A

| POLICIES - 1140 | | | | | | |
|---|---|---|---|---|---|---|
| # | SOURCE_INTERFACE | TARGET_INTERFACE | SIP | DIP | PROTOCOL | DPORT |
| P0 | 10 | WILDCARD | 192.168.1.160/28 | 173.31.1.0/24 | TCP | 53 |
| P1 | 10 | WILDCARD | 192.168.1.176/28 | 173.31.1.0/24 | TCP | 53 |
| P2 | 10 | WILDCARD | 192.168.1.176/28 | 10.0.100.0/24 | TCP | WILDCARD |
| P3 | 20 | WILDCARD | 10.0.100.0/24 | 173.16.0.0/16 | UDP | WILDCARD |
| P4 | 30 | WILDCARD | WILDCARD | WILDCARD | TCP | 80 |

| PACKET: (EXPECTED TO MATCH P4) - 1142 | | | | | | |
|---|---|---|---|---|---|---|
| # | SOURCE_INTERFACE | TARGET_INTERFACE | SIP | DIP | SPORT | DPORT | PROTOCOL |
| | 30 | 100 | 192.168.1.100 | 10.0.0.100 | 30330 | 80 | TCP |

FIG. 11D

ACCELERATING COMPUTER NETWORK POLICY SEARCH

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2018, Fortinet, Inc.

BACKGROUND

Field

Embodiments of the present invention generally relate to methods and systems for accelerating computer network policy search, and more particularly to methods and systems for prescreening packets, traversing decision trees, and evaluating computer network policy rules at high speed.

Description of the Related Art

Large amounts of data are transmitted amongst various computing devices on a daily basis using various computer networks, particularly via the Internet. Since some of this data may include malicious content, various measures and rules, including, but not limited to, Intrusion Prevention Systems (IPS), Firewalls, Intrusion Detection Systems (IDS), Distributed Denial of Service (DDoS) protection and Application Delivery Controllers (ADCs) have been developed to analyze data packets (which may be interchangeably referred to herein simply as packets or as network packets) based on one or more rules/conditions/policies that define packet attributes to indicate whether such packets are desired or undesired. The rules/policies may be used to block or allow matching packets as appropriate. Such rules/conditions/constraints/policies can include, for example, multiple strings, character-based expressions, or regular expressions, which are individually or in combination matched with packet attributes to detect undesired packets and handle them accordingly. For instance, attributes to be matched may include source interface, destination interface, source Internet Protocol (IP) address (SIP), destination IP address (DIP), protocol, source port and destination port. A policy may specify values for these attributes that in turn may be matched with values of corresponding attributes in a packet at issue. Typically, packets are examined by parsing the packets to extract header and payload portions, and subsequently the packets (or parsed portions thereof) are matched against one or more rules/conditions/constraints defined by the packet filtering/processing devices to identify whether the conditions are met, based on which an action associated with the rule/policy is taken (e.g., allow the packet or drop the packet). The ever increasing amount of data transmitted through computer networks and the associated increases in network bandwidth and cyber attacks has led to a commensurate increase in network policies that are used in packet processing devices, such as network security devices (e.g., IPS, IDS, ADC, firewalls, gateways, DDoS attack mitigation devices and Unified Threat Management (UTM) appliances) and routers. Matching an ever increasing number of packets to a similarly ever increasing number of network policies in order to determine whether the packets should be accepted or rejected leads to more and more use of precious computing resources such as processing power and memory and also requires more time to process the packets.

Hardware and software-based accelerators have been developed that use string/pattern matching to reduce system loads; however, due to the multitude of the increasingly complicated rules and policies applied by packet processing devices, existing accelerators either have limitations on certain types of rule syntaxes and/or have limitations on the compiled rule database memory footprint and performance.

Therefore, there is a need for a scalable and a high performance policy search mechanism that can handle the rapid increase in network bandwidth as well as the increasing complexity of network policies/rules to maintain/improve network performance.

SUMMARY

Systems and methods are described for accelerating computer network policy searching. According to one embodiment, a packet is received by a policy search engine (PSE) of a packet processing device. A set of candidate policies are identified from among multiple policies of the packet processing device by screening the multiple policies by a speculation unit of the PSE based on metadata associated with the received packet. Finally, a matching policy for the received packet is identified by a policy search processor (PSP) of the PSE by executing policy-search-specific instructions and general purpose instructions.

Other features of embodiments of the present invention will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 7A is a block diagram illustrating an overview of a PSP in accordance with an embodiment of the present invention.

FIG. 7B is a table listing predicate instructions used by a PSP to traverse decision trees and evaluate rules in accordance with an embodiment of the present invention.

FIG. 7C is a table listing special purpose registers (SPRs) used by a PSP in accordance with an embodiment of the present invention.

FIG. 11A is a table illustrating various policies to be searched by a hash-based PSE (as illustrated in FIG. 4 above) to match a packet in accordance with an embodiment of the present invention.

FIG. 11D is a table illustrating various policies to be searched by a DFA-based PSE to match a packet in accordance with an embodiment of the present invention.

DETAILED DESCRIPTION

Figure 1:
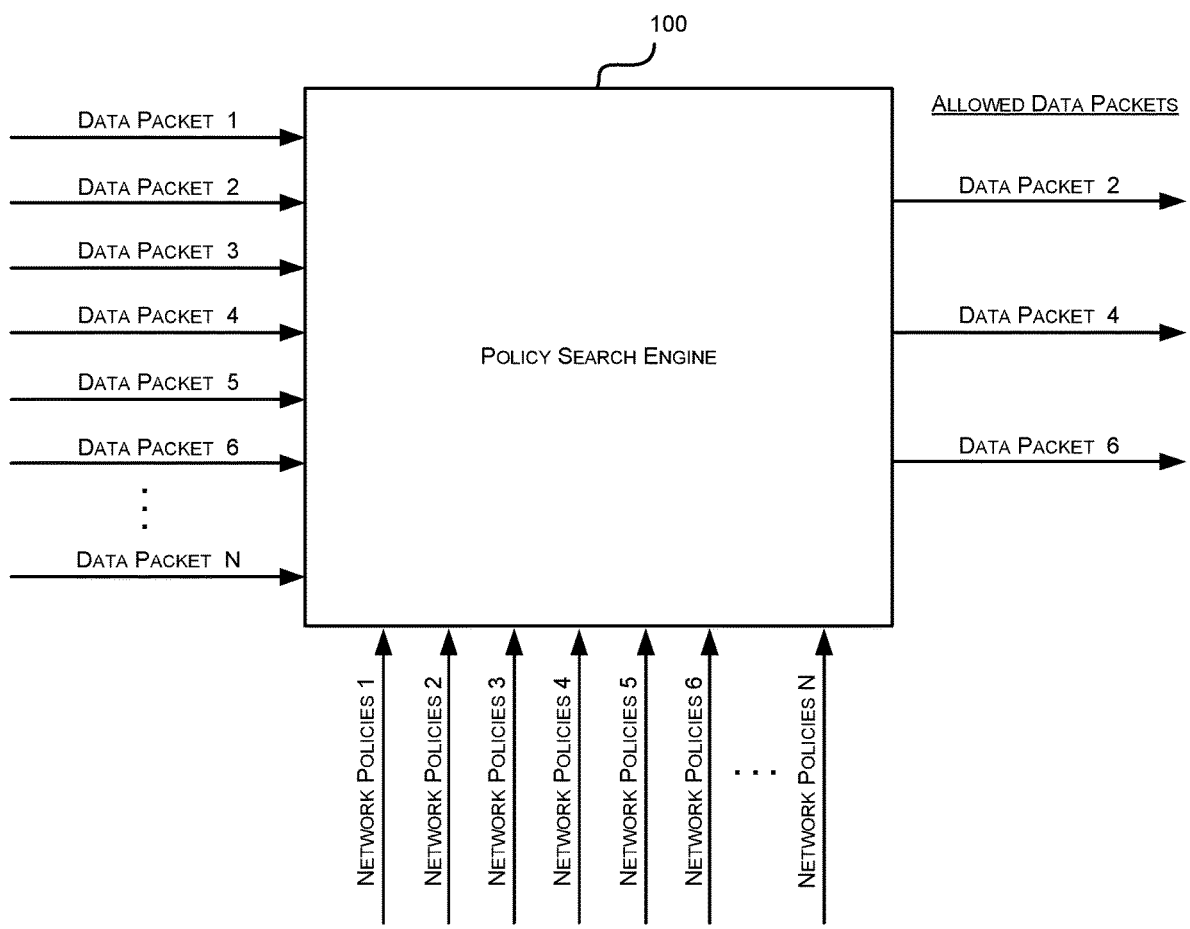
FIG. 1 is a context level diagram illustrating inputs to and outputs of a policy search engine (PSE) in accordance with an embodiment of the present invention.

Systems and methods are provided for accelerating computer network policy searching. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present invention has been described with the purpose of computer network policy searching, it should be appreciated that the same has been done merely to illustrate the invention in an exemplary manner and any other purpose or function for which the explained structure or configuration can be used, is covered within the scope of the present invention.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for accelerating computer network policy searching.

In an aspect, the present disclosure relates to a method for accelerating computer network policy searching including the steps of: receiving, by a policy search engine (PSE) of a packet processing device, a packet; screening, by a speculation unit of the PSE, based on metadata associated with the received packet, a number of policies so as to obtain candidate policies by matching conditions defined in each of the number of policies with the metadata; and identifying, by a policy search processor (PSP) of the PSE, a matching policy for the received packet from among the candidate policies by executing policy-search-specific instructions and general purpose instructions.

In an aspect, the candidate policies can be represented in an n-dimensional space, and each dimension of the n-dimensional space can pertain to a defined packet attribute. In another aspect, the policy-search-specific instructions can order cutting of the n-dimensional space by the PSP based on the metadata, and the PSP can construct a decision tree based on the cut n-dimensional space so as to traverse the decision tree to evaluate the candidate policies and arrive at the matching policy.

In an aspect, the policy-search-specific instructions can be issued by a compiler to which the PSE is operatively coupled, wherein the compiler can include a speculation unit compiler operatively coupled with the speculation unit, and a policy processor compiler operatively coupled with the PSP.

In yet another aspect, the policy-search-specific instructions issued by the compiler can enable any or a combination of avoidance of node explosion, support of explicit Internet Protocol (IP) address searching, support of implicit IP address searching, and cutting on common rules such that the n-dimensional space retains desired information regarding metadata associated with each of the candidate policies.

In an aspect, each dimension of the n-dimensional space can be selected from any or a combination of destination port, source IP address, destination IP address, source interface, target interface, and protocol.

In another aspect, the speculation unit can be based on any or a combination of hash-based pattern matching and Deterministic Finite Automata (DFA) based pattern matching.

In an aspect, the PSP of the present disclosure can be configured to construct a single large decision tree at an early stage of compilation by the compiler such that subsequently only such sub-trees of the single large decision tree where conditions that are used to traverse from root to those sub-trees are met by the speculation unit based on hash-based pattern matching can be further traversed by the PSP.

In another aspect, the PSP can construct multiple decision trees when the speculation unit is based on DFA based pattern matching, wherein each tree of the multiple decision trees can be for a policy group and a root-node identifier can be emitted by the speculation unit, and wherein the root-node identifier can represent an entrance to a decision tree for a particular group of policies.

In yet another aspect, one or more of the candidate policies can be associated with a candidate policy identifier such that the speculation unit outputs multiple candidate policy identifiers.

In an aspect, the functionality of the PSE can be performed using a general-purpose processor.

In another aspect, the PSP can perform co-processor calls to perform any or a combination of routing lookup, hash lookup, botnet lookup, and shaper lookup and management.

In an aspect, the present disclosure further relates to a system that can include a policy search engine (PSE) configured to receive a packet, the PSE further including: a speculation unit configured to, based on metadata associated with the received packet, screen a number of policies so as to obtain at least one candidate policy identifier based on matching of conditions defined in each of the number of policies with the metadata associated with the received packet; and a policy search processor (PSP) configured to receive and execute instructions to obtain at least one matched policy identifier from the at least one candidate policy identifier for the received packet.

In another aspect, the instructions can include any or a combination of general purpose Reduced Instruction Set Computer (RISC) instructions and special purpose policy search instructions, which support decision tree traverse operations and rule evaluation operations.

In yet another aspect, the at least one candidate policy identifier can include one or more candidate policies that can be represented on an n-dimensional space, and each dimension of the space can pertain to a defined packet attribute.

In an aspect, the instructions to the PSP can order cutting of the n-dimensional space based on the metadata associated with the packet, and the PSP can construct a decision tree based on the cut n-dimensional space so as to traverse the decision tree to evaluate the one or more candidate policies and arrive at the at least one matched policy identifier, wherein the at least one matched policy identifier can include one or more matched policies.

In another aspect, the instructions can be issued by a compiler that the PSE is operatively coupled with.

In yet another aspect, the speculation unit can be based on any or a combination of hash-based pattern matching and Deterministic Finite Automata (DFA) based pattern matching.

In an aspect, present disclosure describes methods and circuits for speculating, grouping, partitioning, and evaluating various policy rules (such policy rules being parts of different policies, the two terms being used interchangeably herein). In an exemplary embodiment, such methods can be used for a policy search system, interchangeably termed as a policy search engine (PSE).

In another aspect, a method of the present disclosure represents an n-tuple policy in an n-dimensional space where various dimensions of the n-dimensional space can be representative of various conditions of the n-tuple policy. Matching a policy allows further actions to be taken that can include allowing a data packet to pass through the packet processing device at issue, or dropping/blocking the packet.

Examples of the various dimensions can include source IP, destination IP etc. that can be matched to corresponding packet attributes. Different policies/rules can occupy different subsets of the n-dimensional space.

In yet another aspect, the packet's metadata can be sent/made available to the PSE so as to enable evaluation of the metadata against policies/rules specified so as to determine whether the packet is to be allowed or dropped.

In an aspect, the PSE can have two parts. The first part of the PSE can be termed as a speculation unit, while the second part can be termed as a policy search processor. The speculation unit can perform speculation while the policy search processor can perform decision tree traversing and policy rule evaluation.

In another aspect, the speculation unit can be of two types, one being a hash-based pattern matching speculation unit, and other being a Deterministic Finite Automata (DFA) based pattern matching speculation unit, wherein the former unit can have high parallelism while the latter can have scalability. In yet another aspect, from the various rules, the speculation unit can determine a subset including candidate rule IDs or rule group IDs of which one maybe a possible match to metadata of the packet. The candidate rule IDs or rule group IDs can be emitted by the speculation unit and provided to the PSP. By executing policy-search-specific instructions and general-purpose instructions (as elaborated further below), the PSP can perform decision tree traversing and policy rule evaluation. The policy search processor can optionally perform co-processor calls. The search results can be reported to other on-chip modules or/and a general purpose processor.

In an exemplary embodiment, the method can be implemented by a general-purpose processor without any hardware acceleration.

In an aspect, the policy search engine (which may interchangeably be referred to as the system of the present disclosure) can include a compiler that can take various firewall policies, for example, as input, and output a database for the speculation unit and the instructions for the policy search engine. In this manner, the compiler can include two units: the speculation unit compiler and the policy search processor compiler. Based on a heuristic cut order on a packet's metadata, the policy search processor compiler can allocate each rule/policy into an n-dimensional space, and can construct a decision tree based on the cuts.

In another aspect, the compiler can develop an algorithm to cut on a set of spaces (for instance, a set of cubes) at some dimensions to optimize memory usage. The compiler can use a merge algorithm to avoid node explosion, and an algorithm to support both explicit IP search and implicit IP search. The compiler can also enable cut on common rules such that each n-dimensional space contains as much information on the n-tuple metadata of the policies as possible, thereby improving/accelerating the search performance.

In yet another aspect, the policy search processor compiler can determine the size of the group of rules represented by a candidate ID emitted by the speculation unit compiler based on hash-based pattern matching, taking into consideration memory usage and estimated performance requirements. To avoid creating a huge correlation table in the speculation unit based on hash-based pattern matching (as elaborated further below), the policy search processor compiler can cut certain fields (such fields representing various conditions of various policies) with very high resolution, such that each field value can be used as a condition in each entry of the correlation table, thereby allowing for a high level of granularity in various conditions of various policies that can be matched to that of the packet.

In another aspect, the compiler of a speculation unit based on DFA-based pattern matching can generate multiple field masks to optimally split policies into different groups, based on analysis of the policies. For each such group, the compiler can generate string patterns by masking the n-tuple data of each policy in the group with the field mask for the group, and can construct DFA with those string patterns.

In an aspect, the policy search processor of the PSE disclosed can support both of the two types of speculation units that is, hash-based pattern matching speculation unit and deterministic finite automata (DFA) based pattern matching speculation unit.

In another aspect, for the speculation unit based on hash-pattern matching, one single large decision tree can be constructed by the policy search processor, and the candidate ID emitted by the speculation unit can represent an entry point to a subtree of the decision tree in the policy search processor; while for the speculation unit based on DFA-based pattern matching, multiple decision trees can be constructed by the policy search processor. Each tree can represent a policy group, and a root-node id can be emitted by the DFA-based speculation unit. The root-node id can represent entrance to the decision tree for that particular group of policies in the policy search processor.

FIG. 1 is a context level diagram illustrating inputs to and outputs from a policy search engine (PSE) 100 in accordance with an embodiment of the present invention. In the context of the present example, policy search engine (PSE) 100 can be provided with several network policies shown as network policies 1, network policies 2, . . . , and network policies N. Incoming data packets are shown as data packet 1, data packet 2, . . . , and data packet N. Each data packet can have different attributes e.g., destination port, source IP address, destination IP address, source interface, target interface, and protocol, among other like attributes.

In an aspect, PSE 100 can be tasked with protecting network/devices within an enterprise network, for example. For this purpose, PSE 100 can evaluate/compare attributes of each incoming data packet with allowable attributes (e.g., conditions relating to the attributes) as are provided in various network policies such that only data packets having attributes matching a network policy having an allow action are permitted to pass through PSE 100. Such allowed data packets that are permitted to pass through PSE 100 are shown as data packet 2, data packet 4, and data packet 6.

Those skilled in the art will appreciate that as the complexity of a network along with increasingly complicated rules/policies to be applied for packet processing as well as bandwidth/number of data packets being received for a network increases, the resulting processing load on PSE 100 increases. PSE 100 hence takes more and more time to arrive at decisions pertaining to whether to allow or drop a packet, thereby seriously deteriorating performance of the whole network and devices associated therewith.

Hence, it is desirable for PSE 100 to have a scalable and high performance policy search mechanism that can handle the rapid increase in network bandwidth as well as the increasing complexity of network policies/rules to maintain/improve network performance.

Figure 2A:
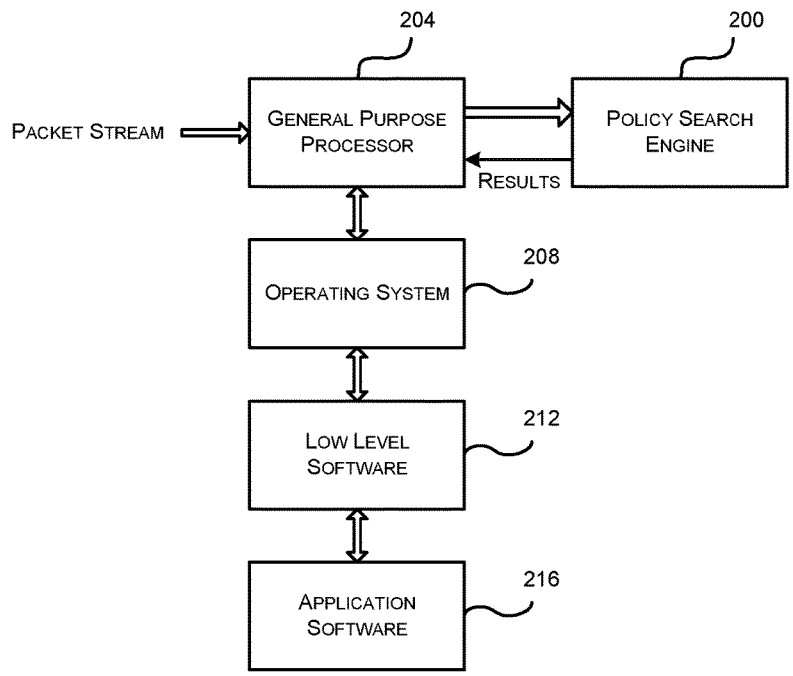
FIG. 2A illustrates an exemplary architecture for policy searching relating to packets received by a general-purpose processor in accordance with an embodiment of the present invention.

FIG. 2A illustrates an exemplary architecture for policy searching relating to packets received by a general-purpose processor in accordance with an embodiment of the present invention. In the context of the present example, a packet stream is received by a general-purpose processor 204, which in turn makes the packet stream available to PSE 200.

In this scenario, PSE 200 acts as a co-processor on behalf of general-purpose processor 204, and provides results to general-purpose processor 204. Operating system 208, low level software 212 and application software 216 are executed by general-purpose processor 204.

Figure 2B:
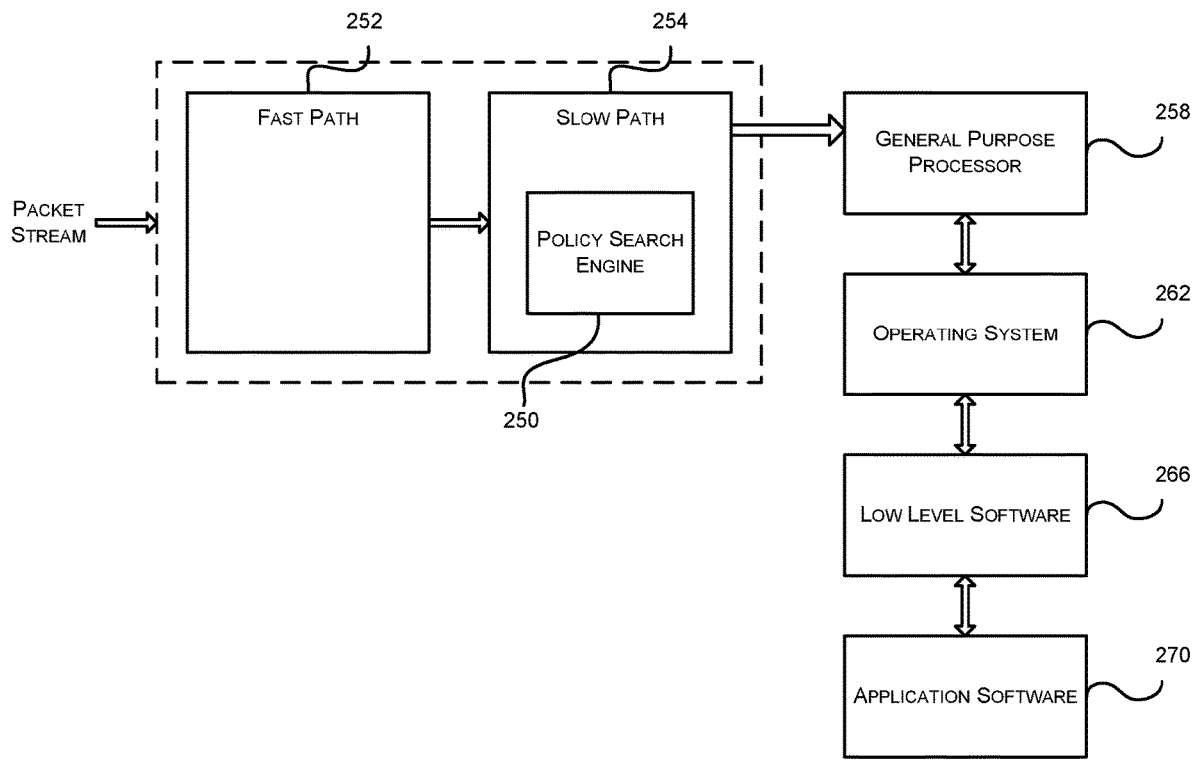
FIG. 2B illustrates an exemplary architecture for policy searching relating to packets received by a PSE in accordance with an embodiment of the present invention.

FIG. 2B illustrates an exemplary architecture for policy searching relating to packets that are first received by a PSE 250 in accordance with an embodiment of the present invention. In this alternative architecture, PSE 250 receives the packet stream before general-purpose processor 258. Incoming packet stream can be processed via a fast path 252 or a slow path 254. Subsequent packets of an established session can typically be considered by fast path 252, whereas the first packet of a session goes through slow path 254, including PSE 100, for session establishment. Packets allowed to pass are then provided to general-purpose processor 258 for further action using operating system 262, low level software 266, and application software 270, as required.

Figure 2C:
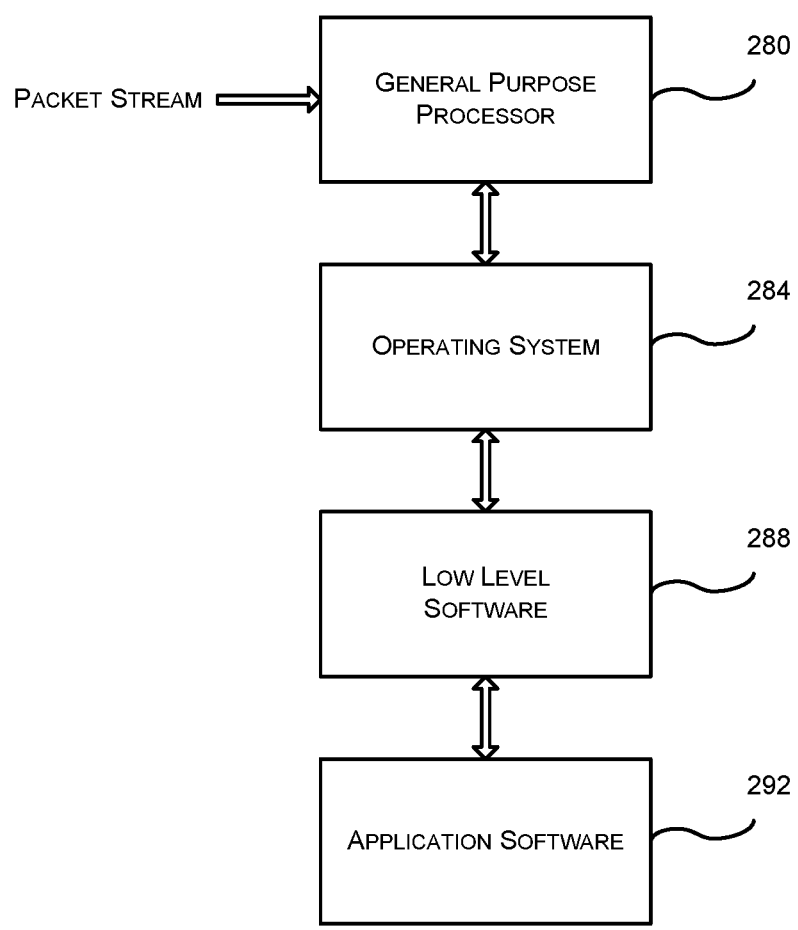
FIG. 2C illustrates an exemplary architecture for policy searching relating to packets received by a general-purpose processor having a PSE implemented as software running on the general-purpose processor in accordance with an embodiment of the present invention.

FIG. 2C illustrates an exemplary architecture for policy searching relating to packets received by a general-purpose processor 280 having a PSE implemented as software running on general-purpose processor 280 in accordance with an embodiment of the present invention. In the context of the present example, the policy search engine is implemented as software (for instance, application software 292) executed by operating system 284 and potentially interacting with low level software 288.

Figure 3:
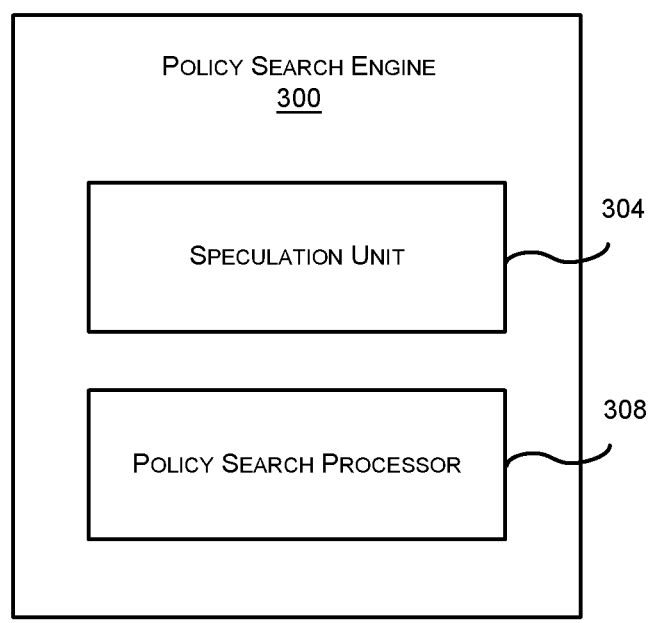
FIG. 3 is a block diagram illustrating functional modules of a PSE in accordance with an embodiment of the present invention.

FIG. 3 is a block diagram illustrating functional modules of a PSE 300 in accordance with an embodiment of the present invention. In the context of the present example, PSE 300 includes, among other components, a speculation unit 304 and a policy search processor 308 as further elaborated below.

As those skilled in the art will appreciate, PSE 300 may represent part of a packet processing device, such as a network security device (e.g., an Intrusion Prevention System, a firewall, an Intrusion Detection System, a Distributed Denial of Service (DDoS) mitigation appliance, a Unified Threat Management (UTM) appliance), an Application Delivery Controller (ADC), a router and like systems. Speculation unit 304 and policy search processor (PSP) 308 can be implemented in hardware or software or a combination thereof.

In an aspect, speculation unit 304 can screen a number of policies based on metadata associated with a received packet, so as to identify one or more candidate policy identifiers based on matching of conditions defined in the policies with metadata associated with the received packet.

In another aspect, PSP 308 can receive and execute instructions to obtain at least one matched policy identifier from the one or more candidate policy identifiers for the received packet. The instructions can include any or a combination of general purpose RISC instructions and special purpose policy search instructions.

In yet another aspect, the at least one candidate policy identifier can include one or more candidate policies that can be represented within an n-dimensional space. The dimensions can represent different conditions and sets of such conditions can constitute different policies. For instance, a policy can have source IP of 192.168.1.160/28, a destination IP of 173.31.1.0/24, a protocol of TCP and a destination port (Dport) of 53. The policy can be represented in the n-dimensional space, with each dimension representing one of these conditions and various points on various dimensions representing the values of corresponding conditions. As can be readily understood, different policies with different values of these conditions can likewise be represented in n-dimensional space. To determine whether a policy matches an incoming packet, the policy conditions are matched against the incoming packet attributes (e.g., as contained in various packet headers and which may also be referred to herein as the packet's metadata).

In an aspect, the instructions to PSP 308 can order cutting of the n-dimensional space based on the metadata associated with the packet. PSP 308 can construct a decision tree based on the cut n-dimensional space so as to traverse the decision tree to evaluate the one or more candidate policies to identify at least one matched policy identifier. The at least one matched policy identifier can include one or more matched policies, and the instructions to PSP 308 can be issued by a compiler associated with PSE 300.

In this manner, PSE 300 can perform speculative analysis (using speculation unit 304) to quickly narrow down a very large number of policies to a smaller number of candidate policies that can be evaluated by PSP 308, of which one could match the metadata attributes of the received packet. Further, decision tree traversing can be done (using PSP 308) of the smaller number of policies to determine at least one matched policy and its corresponding identifier. Having determined the at least one matched policy, the packet can be processed according to an action specified thereby. For instance, the packet could be allowed to proceed to its target destination (that could be, for instance, a client device within the network being protected by a network security device in which PSE 300 operates).

Different techniques can be implemented for the purpose of speculation using speculation unit 304. Speculation unit 304 can perform speculation based on any or a combination of hash-based pattern matching and Deterministic Finite Automata (DFA) based pattern matching.

For hash-based pattern matching, various policies that PSE 300 is tasked with searching can be represented in an n-dimensional space, each dimension representing a condition of rules/policies to be searched. Many of these rules may have overlapping conditions. For instance, many rules can have the same source IP address value or range of source IP address values, many other rules can have the same destination IP address value or range of destination IP address values, and still other rules may have some commonality between their specified source IP address ranges and/or their specified destination IP address ranges. A speculation unit based on hash-based pattern matching can use such common values to narrow down the number of rules to be searched. This smaller number of rules can then be made available to PSP 308 for further matching.

In case of DFA based pattern matching, speculation unit 304 can have a field mask module to generate multiple field masks. These masks can be applied to n-tuple metadata of incoming packets. Such masked n-tuple metadata can be further processed by a DFA-based pattern matching module that can emit a root-node id. This root-node id can represent an entrance to a group of policies that need to be further processed by PSP 308. In this manner, the number of policies to be searched can be narrowed.

In an aspect, after the number of policies to be searched has been narrowed down using speculation, the remaining candidate policies can be analyzed and their conditions matched with attributes of incoming data packet to determine an exact match of a policy/rule to the attributes as present in the metadata of the received packet.

For this purpose, PSP 308 can execute regular general-purpose RISC-like instructions using a primitive datapath, and can execute policy-search-specific instructions (special policy processing instructions) using a predicate datapath. The primitive datapath can communicate/interface with general purpose registers (GPRs), while the predicate datapath can communicate/interface with special purpose registers (SPRs). The special policy processing instructions can be designed to traverse decision trees and evaluate rules.

PSP 308 can receive a query based upon which it can fetch different instructions elaborated above, and can finally output a matching output as well as I/O to routing, hash table, shaper etc. PSP 308 can also make use of one or more co-processors to perform special operations, e.g. routing search or off-chip hash search, etc.

While PSE 300 is described herein as including speculation unit 304 and PSP 308, in other configurations these components can be represented as modules external to PSE 300 that provide a service on behalf of PSE 300. All such different combinations and embodiments are part of the present disclosure.

Figure 4:
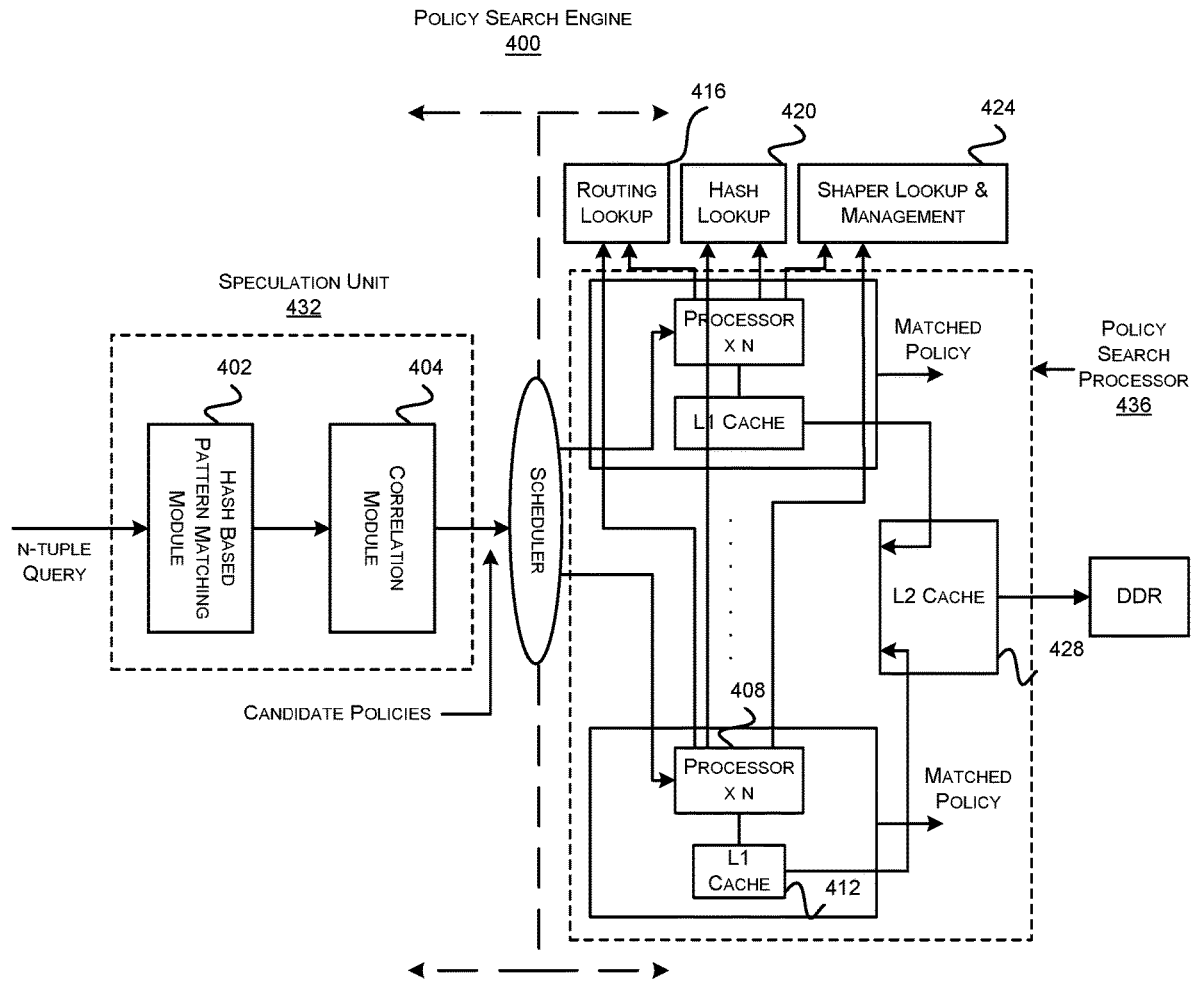
FIG. 4 is a block diagram illustrating an architecture of a PSE implementing a hash-based pattern matching speculation unit prior to a policy search processor (PSP) in accordance with an embodiment of the present invention.

FIG. 4 is a block diagram illustrating an architecture of a PSE 400 implementing a hash-based pattern matching speculation unit 432 prior to a policy search processor (PSP) 436 in accordance with an embodiment of the present invention.

In the context of the present example, PSE 400 can have a hash-based pattern matching speculation unit 432 (similar to speculation unit 304 of FIG. 3) and a policy search processor 436 (similar to policy search processor 308 of FIG. 3).

Responsive to receipt of an n-tuple query, representing packet metadata to be matched, PSE 400 can find all the matched rules (policies) if any. For this purpose, PSE 400 can perform two steps. The first step is speculation, which is performed by a combination of a hash-based pattern-matching module 402 and a correlation module 404 of hash-based pattern matching speculation unit 432 (which may be referred to herein as speculation unit 432 or SU 432) and the second step is policy matching, which is performed by PSP 436.

According to one embodiment, hash-based pattern matching speculation unit 432 can perform speculation based on pattern matching of the n-tuple query's data elements against the rule set's conditions in n-dimensions, and correlation among the matching patterns to further narrow down the possible matched rules to a set of candidates, with some false positives. For each possible matched rule, speculation unit 432 can emit a candidate rule ID.

In this manner, hash-based pattern matching speculation unit 432 can perform pattern matching to arrive at a lesser number of rules (policies) as described further below with reference to FIG. 5. Conditions of at least one of such rules may match attributes of the metadata associated with the received packet.

The candidate rule ID can represent one rule if the speculation unit 432 can single out this particular rule. On the other hand, a candidate rule ID can represent a group of rules if the speculation unit 432 has to put multiple rules into one candidate rule ID. As can be readily understood, many times these multiple rules can have some similarity with regard to some conditions. An n-dimensional space can be visualized wherein the various dimensions can each be used to represent conditions of rules to be implemented on various packet header fields. To allocate a rule in this n-dimensional space, the space can be cut on multiple dimensions and a decision tree constructed based on the cuts.

In another aspect, policy search processor 436 (interchangeably termed as processor 436 or PSP 436) can consist of multiple identical processors 408, L1 instruction caches 412 and L2 instruction caches 428. In an aspect, if PSP 436 receives a single-rule candidate ID, it can compare the rule against the corresponding packet's metadata to decide whether to allow or drop the packet. Upon receiving a multi-rule candidate ID, PSP 436 can first perform decision tree traversal on the multiple rules to reach a leaf node that can have a single rule or a smaller number of rules. In this manner, the system of the present disclosure can very rapidly compare attributes of various incoming packets against various network policies to decide how to process such packets (e.g., which packets to pass on to the network and which ones to drop). The system of the present disclosure enables a high performance policy search engine that can handle the rapid increase in network bandwidth as well as the increasing complexity of network policies/rules to maintain/improve network performance.

Figure 5:
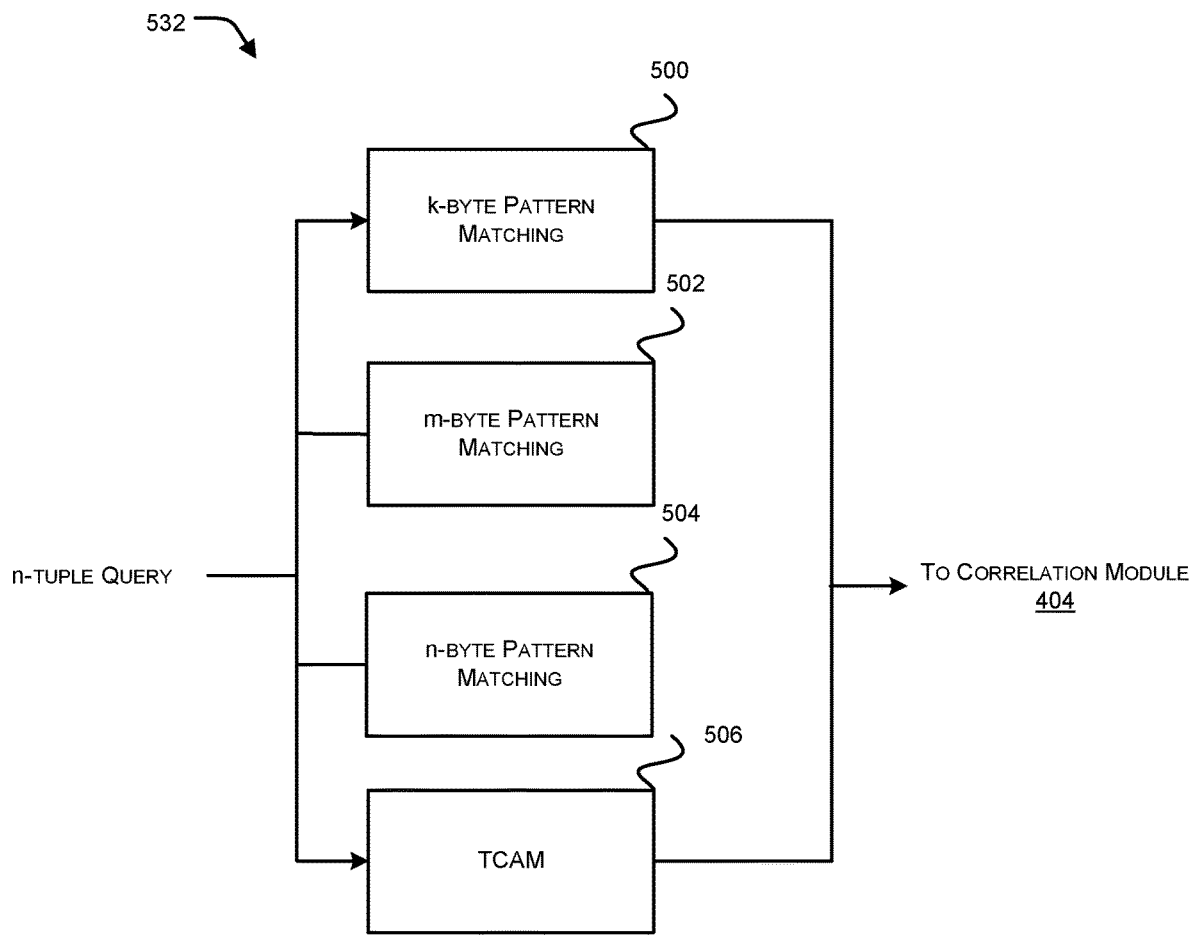
FIG. 5 is a block diagram illustrating an exemplary implementation of a hash-based pattern matching speculation unit in accordance with an embodiment of the present invention.

FIG. 5 is a block diagram illustrating an exemplary implementation of a hash-based pattern matching speculation unit 532 in accordance with an embodiment of the present invention.

In the context of the present example, hash-based pattern matching speculation unit 532 (which may represent hash-based pattern matching speculation unit 432 of FIG. 4) can have hash based pattern matching tables for various lengths shown as k-byte pattern matching 500, m-byte pattern matching 502 and n-byte pattern matching 504. The hash based pattern matching tables may be stored within an embedded ternary content addressable memory (TCAM) 506. TCAM 506 may also store special rules, for instance, rules with wildcards at special locations, and rules with weak conditions on each dimension while the correlation between these conditions is strong. In an exemplary embodiment, 2-byte, 3-byte, 4-byte, 6-byte, 8-byte, 10-byte, 14-byte and 16-byte hash based pattern matching tables can be implemented. The outputs of such hash-based pattern matching is then provided to a correlation module, such as correlation module 404 of FIG. 4.

Figures 6A, 6B:
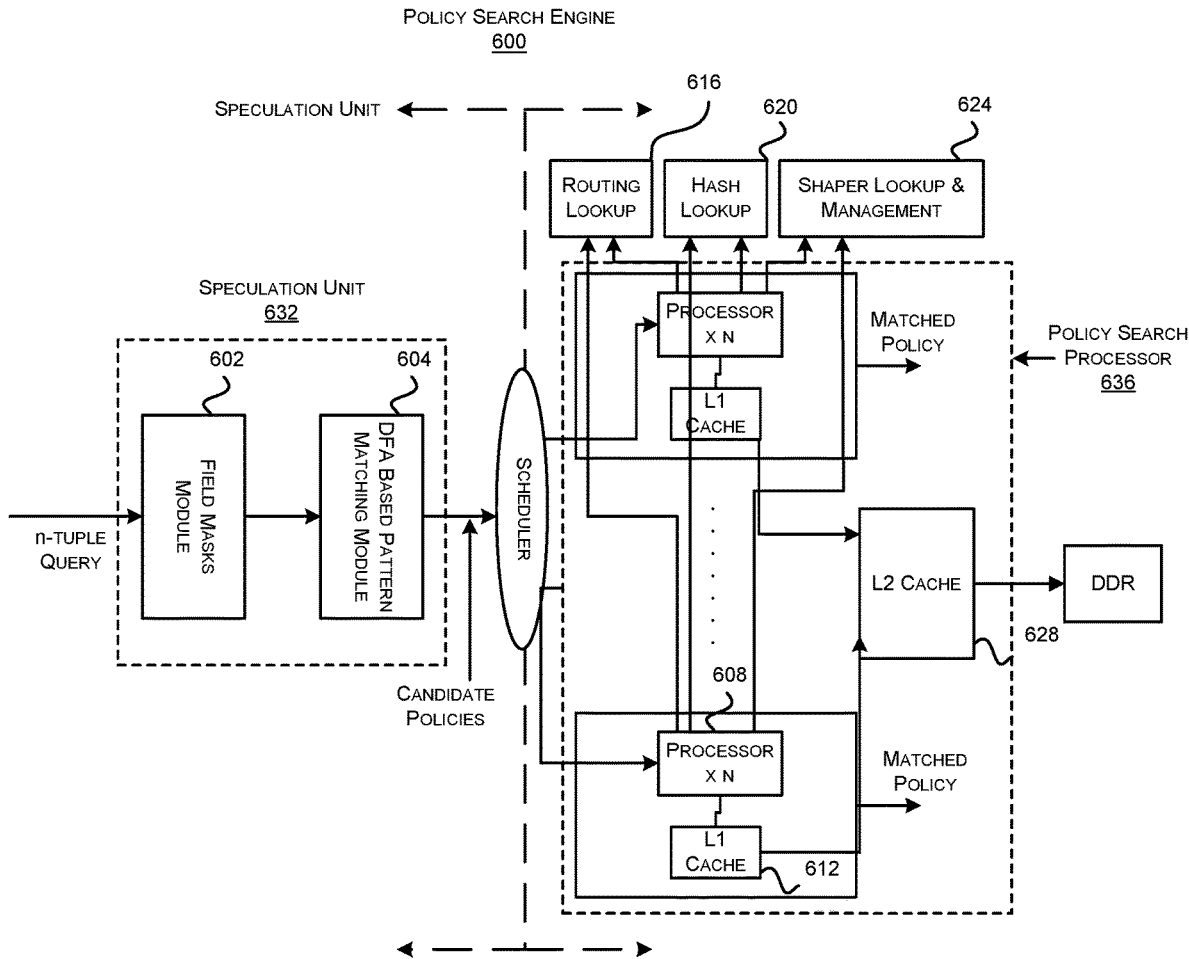
FIG. 6A is a block diagram illustrating an architecture of a PSE implementing a Deterministic Finite Automata (DFA) based pattern matching speculation unit prior to a PSP in accordance with an embodiment of the present invention.
FIG. 6B is a table summarizing field mask information for a DFA-based speculation unit in accordance with an embodiment of the present invention.

FIG. 6A is a block diagram illustrating an architecture of a PSE 600 implementing a Deterministic Finite Automata (DFA) based pattern matching speculation unit prior to a PSP 636 in accordance with an embodiment of the present invention.

In the context of the present example, PSE 600 employs DFA-based pattern matching speculation instead of hash-based pattern matching speculation described above with reference to FIG. 4, while PSP 636 can remain as described above. In this case, speculation unit 632 includes a field masks module 602 and a DFA based pattern matching module 604 while policy search processor 636 can be similar to policy search processor 436/PSP 308 described above. In this case, compiler/field masks module 602 can generate multiple field masks. Each of these masks can be applied to n-tuple metadata of various packets. Next, each masked n-tuple metadata can be fed into the DFA-based pattern matching module 604. Module 604 can emit a root-node id that can represent entrance to a group of policies that need to be further processed by policy search processor 636.

The field masks information for speculation unit 632 based on DFA pattern matching is summarized below with reference to FIG. 6B.

FIG. 6B is a table summarizing field mask information for a DFA-based speculation unit in accordance with an embodiment of the present invention. The field masks information for a speculation unit based on DFA-based pattern matching can be as shown, defining different types of pattern streaming. Field masks module 602 can split policies into different groups. For instance, a byte mask that may represent a group of policies which care only about service, could be defined such that a pattern is constructed by only one byte of protocol and two bytes of destination port of a policy. For IPv4, 21 bits of the byte-mask field are used to define corresponding bytes of the packet at issue to be streamed into the DFA engine (e.g., DFA based pattern matching module 604). For IPv6, the byte_mask field includes 45 bits, representing flags designating the corresponding bytes of the packet at issue to be streamed into the DFA engine.

FIG. 7A is a block diagram illustrating an overview of a policy search processor (PSP) 700 in accordance with an embodiment of the present invention. In the context of the present example, PSP 700 represents a second part of a policy search engine, for example, following hash-based speculation or DFA based speculation. PSP 700 may represent PSP 308 in FIG. 3, PSP 436 in FIG. 4 and/or PSP 636 in FIG. 6. PSP 700 performs exact rule matching among the candidates identified by the first part of the policy search engine.

In the context of the present example, PSP 700 includes two paths, a primitive datapath 704 and a predicate datapath 702. The primitive datapath 704 can execute regular general-purpose RISC-like instructions, while the predicate datapath 702 can execute the policy-search-specific instructions (special policy processing instructions). For this purpose, primitive datapath 704 can make use of general purpose registers 712 (GPRs), while predicate datapath 702 can make use of special purpose registers (SPRs) 714. Examples of SPRs 714 are described below with reference to FIG. 7C.

In another aspect, PSP 700 can receive a query, based on which it can fetch instructions as shown at 708, and can finally output a matching output as well as I/O to routing, hash table, shaper etc. as shown. PSP 700 can have co-processors to perform special operations, e.g. routing search or off-chip hash search, etc. In yet another aspect, PSP 700 can execute/use special policy processing instructions (predicate instructions), which can be designed to traverse decision trees and evaluate rules. Examples of various special policy processing instructions are described below with reference to FIG. 7B.

FIG. 7B is a table listing predicate instructions used by a PSP to traverse decision trees and evaluate rules in accordance with an embodiment of the present invention. As noted above, PSP of policy search engine can use special policy processing instructions (predicate instructions). These instructions can be designed to traverse decision trees and evaluate rules. As illustrated in FIG. 7B, such instructions can include, but are noted limited to, an event range comparison (ERC) instruction, a bit map count (BMC) instruction, a set flag if element equal to immediate (ECSFEQ) instruction, a set flag if element not equal to immediate (ECSFNEQ) instruction, a set flag if element greater than or equal to unsigned to immediate (ECSFGEU) instruction, a set flag if element greater than unsigned to immediate (ECSFGTU), an element compare or branch if matches (ECOB) instruction, and a branch based on value of a general purpose register (CASE) instruction.

FIG. 7C is a table listing examples of special purpose registers (SPRs) used by a PSP in accordance with an embodiment of the present invention. In an aspect, SPRs used by a PSP can include ERC RESULT with a bit size of 5 and BMC RESULT with a bit size of 6, with corresponding descriptions as shown in FIG. 7C.

In this manner, a combination of the predicate instructions (special policy processing instructions) and the general-purpose RISC-like instructions (primitive instructions) can be used to traverse decision trees generated by the compiler.

Specifically, when visiting a node in the decision tree, an ERC instruction can be used to determine the outgoing edge. If the outgoing edge is out of range, ERC_vld flag can be set to be 0. Otherwise, the result can be written into the special purpose register ERC_result, and the ERC_vld flag set to be 1. Then, a BMC instruction can be used to find the address offset of the child node specified by the outgoing edge in ERC_result, and the result can be written into the special register BMC_result. Then, a CASE instruction can be used to jump to the exact address corresponding to the offset specified in BMC_result. Upon reaching a leaf-node in the decision tree, ECSF and ECOB instructions can be used to test rule conditions. Hence, one possible instruction sequence can be:

ERC→BMC→CASE→ECSF/ECOB.

Figure 8:
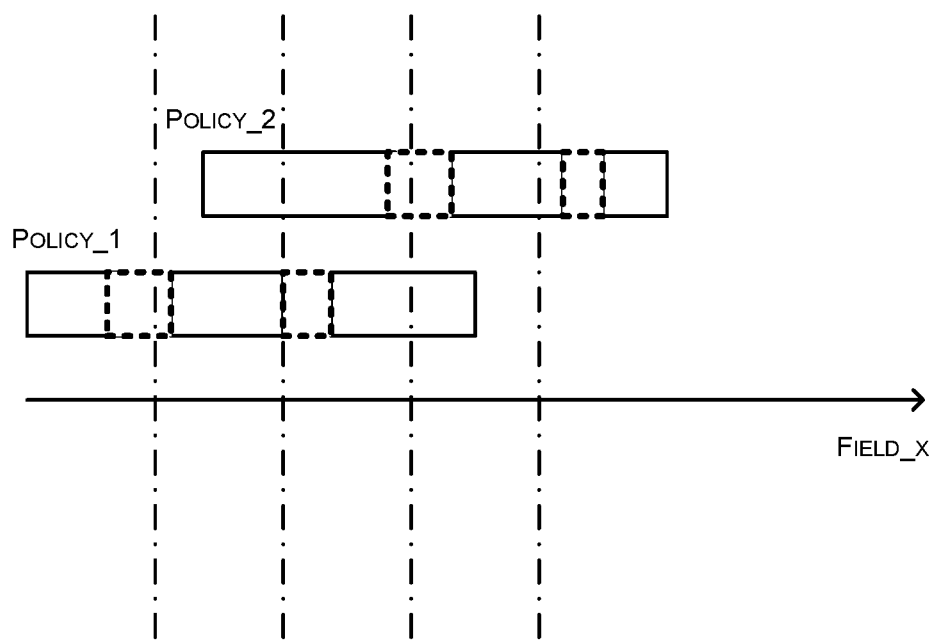
FIG. 8 conceptually illustrates cuts on a set of cubes (represented in 2-D space) on a certain field in accordance with an embodiment of the present invention.

FIG. 8 conceptually illustrates cuts on a set of cubes (represented in 2-D space) on a certain field in accordance with an embodiment of the present invention. FIG. 8 illustrates cuts on a set of cubes on a certain field. The policies in this instance can have discrete coverages on field x, that can accordingly result in cut objects in that field that are a set of ranges (cubes if multiple fields involved) instead of a single range.

Figure 9:
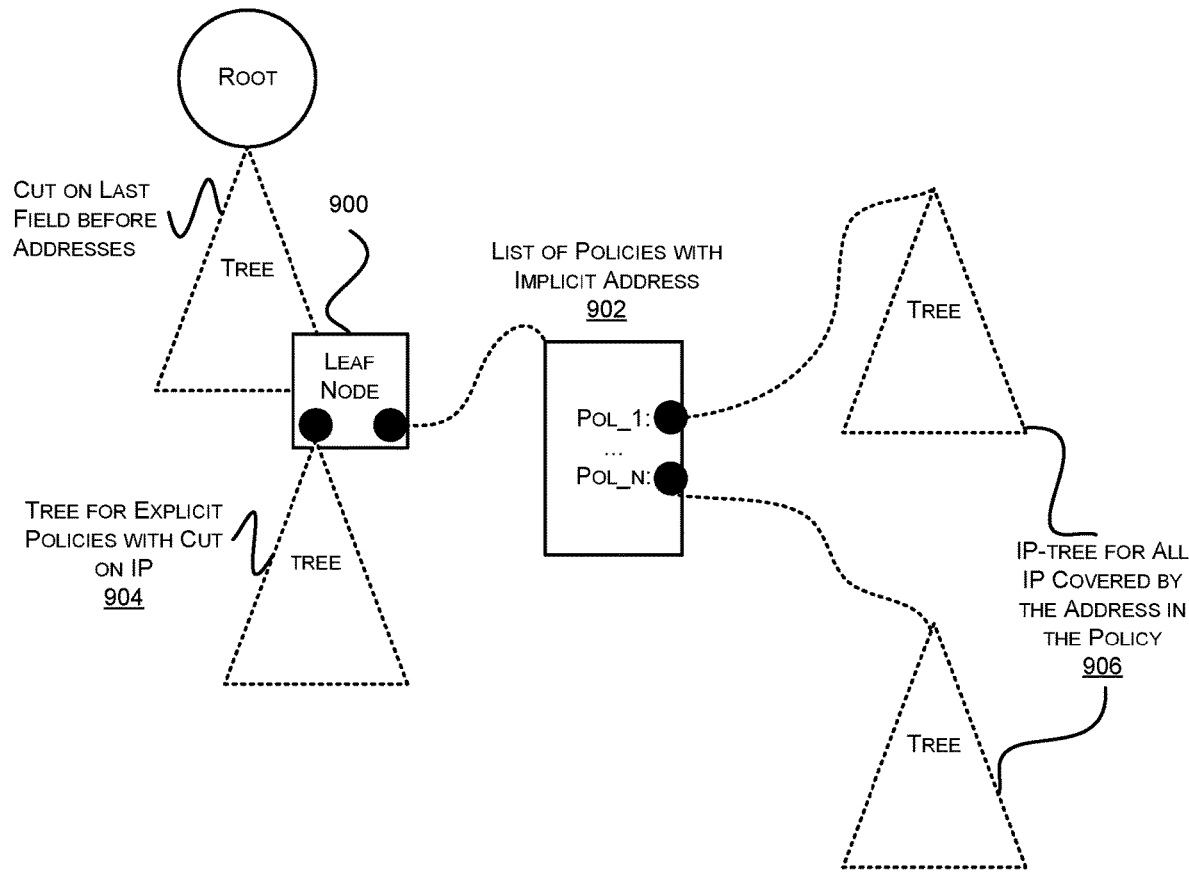
FIG. 9 conceptually illustrates how a PSP supports both explicit and implicit addresses in policies in accordance with an embodiment of the present invention.

FIG. 9 conceptually illustrates how a PSP supports both explicit and implicit addresses in policies in accordance with an embodiment of the present invention.

The PSP of the present disclosure can support both explicit and implicit addresses in policies. Specifically, addresses can be cut after finishing the cut on all other fields. For instance, if the field that is cut before addresses is port, then in each leaf node (rectangle 900) of the decision tree after finishing cut on port, policies can be split into two groups: one group has only policies with implicit addresses as shown at 902, and the other one has only policies with explicit addresses. For the group of policies with explicit addresses, a decision tree can be built by cutting on addresses for the policies in the group as shown at 904; while for the group of implicit addresses, each implicit address can point to a tree, which is the decision tree built by cutting on all the IPs covered by the address, as shown at 906.

Figure 10:
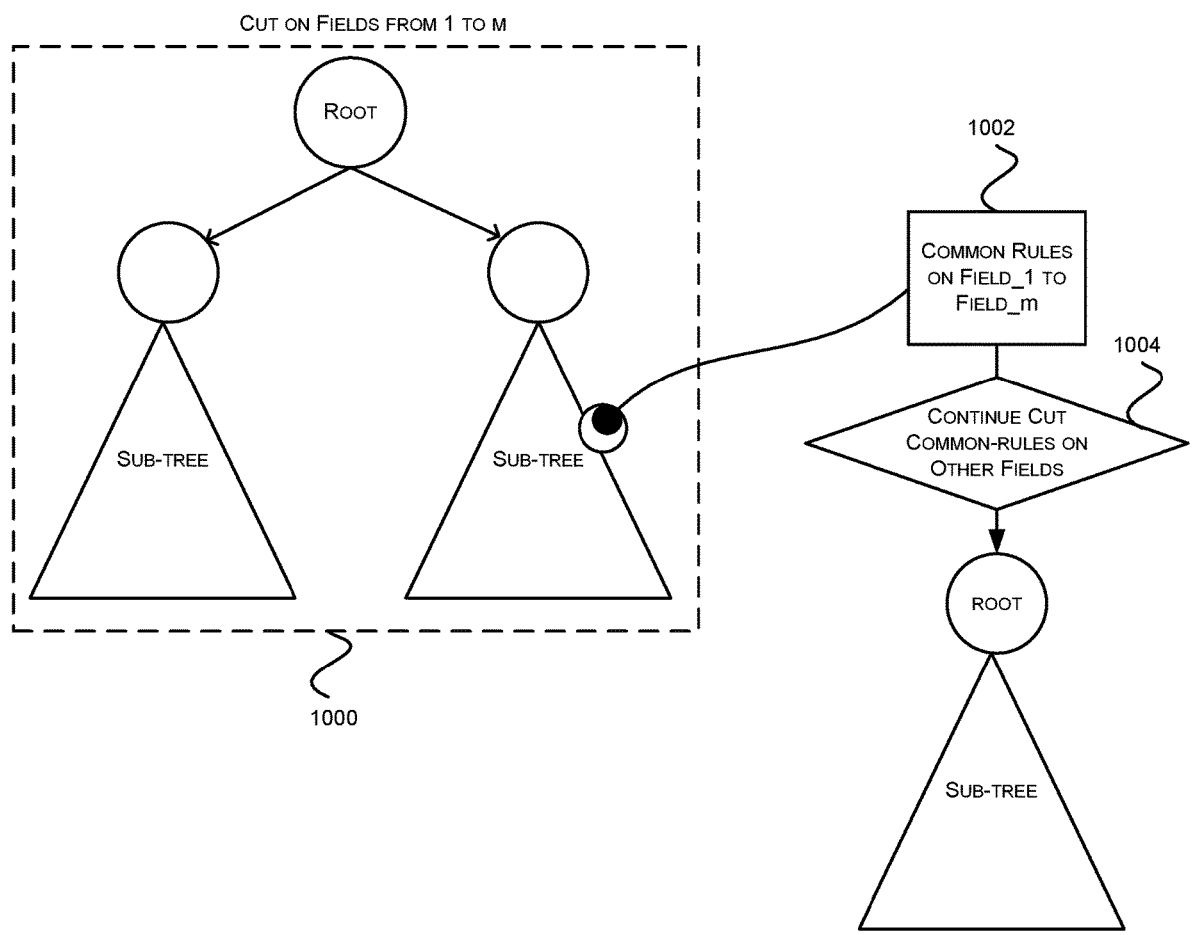
FIG. 10 conceptually illustrates a cut algorithm on nodes with common rules in accordance with an embodiment of the present invention.

FIG. 10 conceptually illustrates a cut algorithm on nodes with common rules in accordance with an embodiment of the present invention. In an aspect, PSE of the present disclosure can exploit a heuristic cut order to cut a packet's metadata, and can accordingly generate nodes with common rules on a certain cut stage. For instance, the PSE can generate a node with common rules on field 1 to field m (black dot in rectangular 1000, further shown as 1002). Though such rules are not differentiable on fields 1-m, they could be differentiable on other fields that are not yet cut. Hence, the PSE can continue to cut the policies in the node on remaining fields, as shown at 1004. In this manner, a balance of performance between the speculation unit and the policy search processor can be achieved.

Figure 11B:
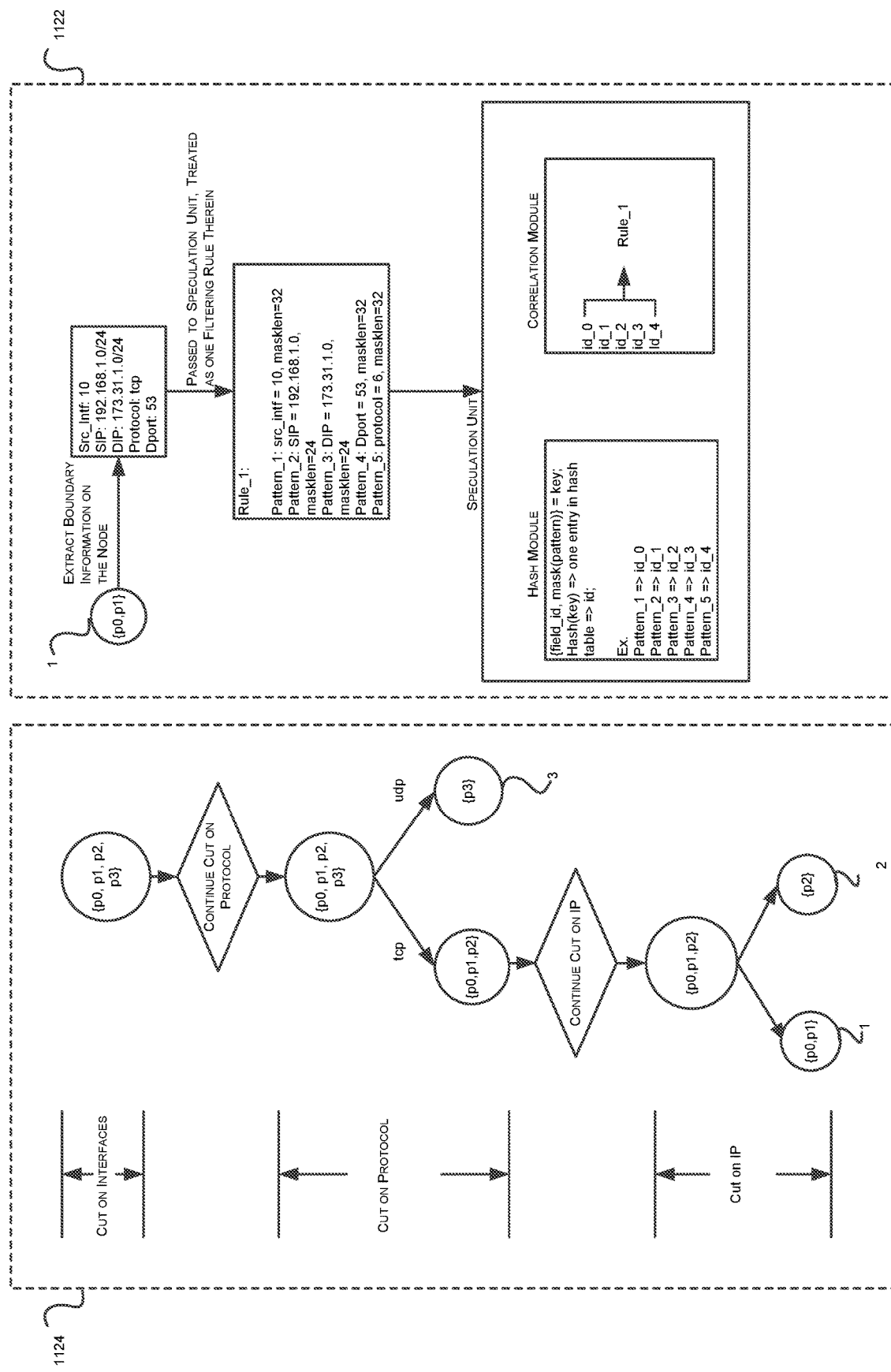
FIG. 11B conceptually illustrates how a PSE compiles policies (as illustrated in FIG. 11A) for an exact match in accordance with an embodiment of the present invention.

FIG. 11A is a table illustrating various policies 1102 to be searched by a hash-based PSE (e.g., PSE 400 discussed above with reference to FIG. 4) to match a packet 1104 in accordance with an embodiment of the present invention. The policy search engine can take these policies as input and can match received packets against these policies in the manner described above. A packet whose various attributes (as can be determined from its metadata or payload, for example) that matches any one of these policies (that is, condition sets of the policies) can then be acted upon further (that is, can be passed, or can be dropped, based upon instructions provided to the PSE of the present disclosure). With respect to FIG. 11A, PSE of the present disclosure can receive packet 1104, which is expected to match policy p0 in list 1102. FIG. 11B conceptually illustrates how a PSE compiles policies (as illustrated in FIG. 11A) for an exact match in accordance with an embodiment of the present invention. Block 1122 illustrates a speculation unit (of the PSE) including a hash module and a correlation module, wherein the output of block 1122 can be passed on to block 1124, which can then apply a PSP, such as PSP 436. The PSP perform exact matching by traversing a decision tree, as shown in block 1124.

Figure 11C:
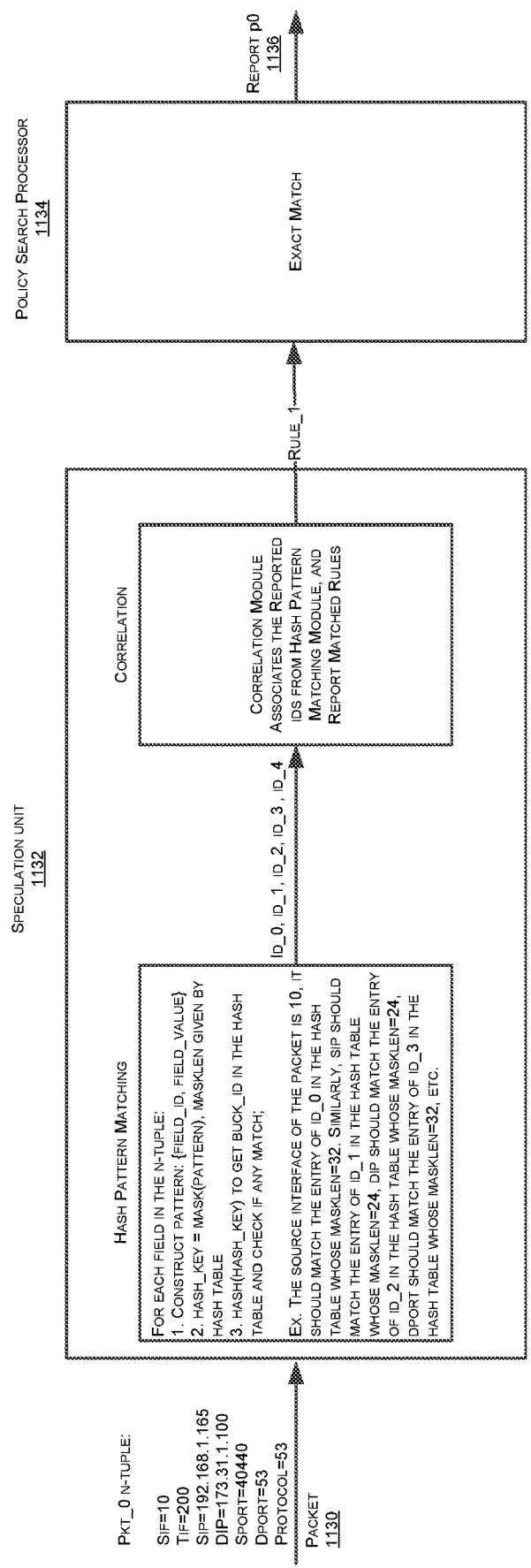
FIG. 11C is a block diagram illustrating how a PSE (as in FIG. 4 above) processes a packet at an inference stage in accordance with an embodiment of the present invention.

FIG. 11C is a block diagram illustrating how a PSE (as illustrated in FIG. 4 above) processes a packet at an inference stage in accordance with an embodiment of the present invention. As illustrated, a packet 1130 can first be provided to speculation unit 1132 of the policy search engine (PSE). Speculation unit 1132 can inspect the meta-data (n-tuple) of the packet 1130, and can report any possible candidates (for instance, rule_1 as shown at block 1122 in FIG. 11B). Each candidate ID can specify a particular entry point in a decision tree for exact match processing by policy search processor 1134 (for instance, rule_1 can let the policy search processor do exact match starting from node_1 as shown in FIG. 11B, block 1124). The policy search processor 1134 can establish an exact match for each candidate and can report any matched policies, for instance, policy p0 as shown at 1136.

FIG. 11D is a table illustrating various policies 1140 to be searched by a DFA-based PSE to match a packet 1142 in accordance with an embodiment of the present invention. In this example, packet 1142 is expected to match policy p4 in policies 1140.

Figure 11E:
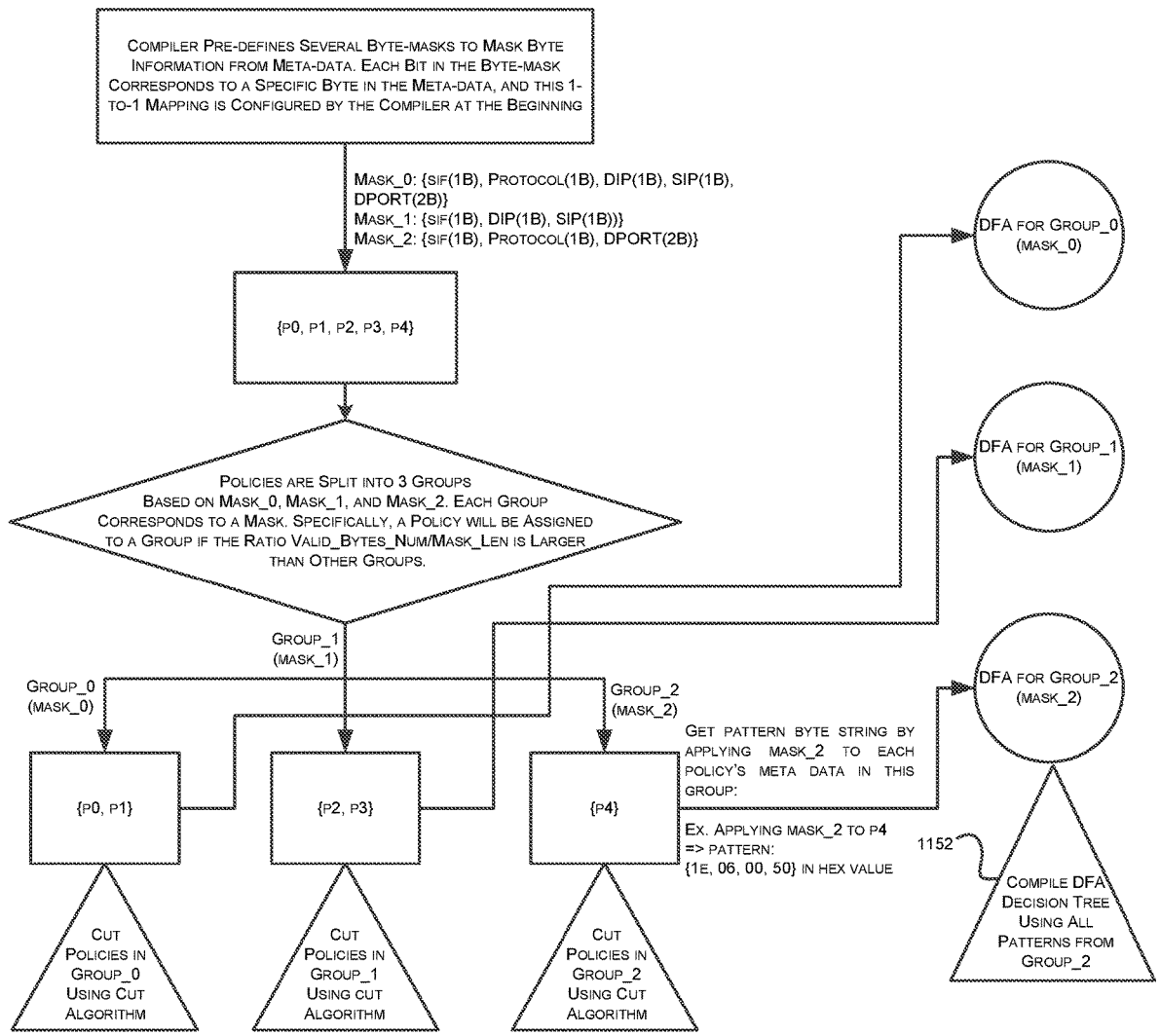
FIG. 11E illustrates how a PSE compiles the policies given in FIG. 11D for an exact match and DFA based pattern matching in accordance with an embodiment of the present invention.

FIG. 11E illustrates how a PSE compiles the policies given in FIG. 11D for an exact match and DFA-based pattern matching in accordance with an embodiment of the present invention. In an aspect, compiler of the policy search engine disclosed can compile the policies given in FIG. 11D for exact match, using a policy search processor and a DFA-based speculation unit.

Based on the field_masks (e.g. mask_0, mask_1 and mask_2), the policies can be split into multiple groups. Inside a group, policies can be cut using a cut algorithm. Each group can also compile a corresponding DFA decision tree for pre-screening. The patterns for a DFA decision tree can be generated by applying the field_mask to each policy in the group corresponding to that DFA decision tree. In example illustrated in FIG. 11E, the PSE compiler pre-configures three field_masks: mask_0, mask_1 and mask_2. Therefore, policies are split into three groups. Three decision trees are created for exact-matching by using the cut algorithm, one for each group. Further, three DFA decision trees are created in DFA-based speculation unit by using patterns generated from policies in each group, for example as shown at 1152.

Figure 11F:
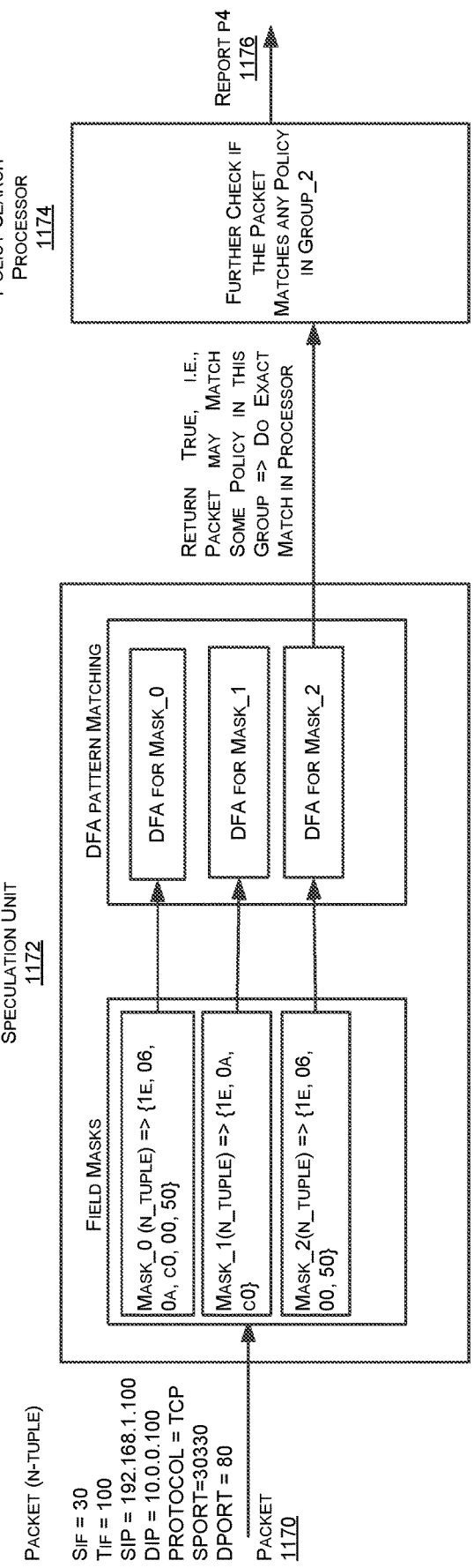
FIG. 11F illustrates how a PSE processes a packet at an inference stage in accordance with an embodiment of the present invention.

FIG. 11F illustrates how a PSE processes a packet 1170 at an inference stage in accordance with an embodiment of the present invention. In an exemplary embodiment, packet 1170 can be made available to a speculation unit 1172 first. Speculation unit 1172 can apply field_masks to meta-data of packet 1170 to construct string patterns, and can search the string patterns in DFA decision trees, and can report true or false for each DFA decision tree. A "true" in the report means packet 1170 has the possibility of matching some policy in the policy group corresponding to that particular DFA decision tree. That policy group_id can be sent to policy search processor 1174 for performing exact match processing within that group. In this example, DFA decision tree for group_2 (mask_2) reports true for packet 1170, and passes the policy group_id 2 to policy search processor 1174, which performs exact matching within policy group_2 and finally reports policy 4, as shown at 1176.

Figure 11G:
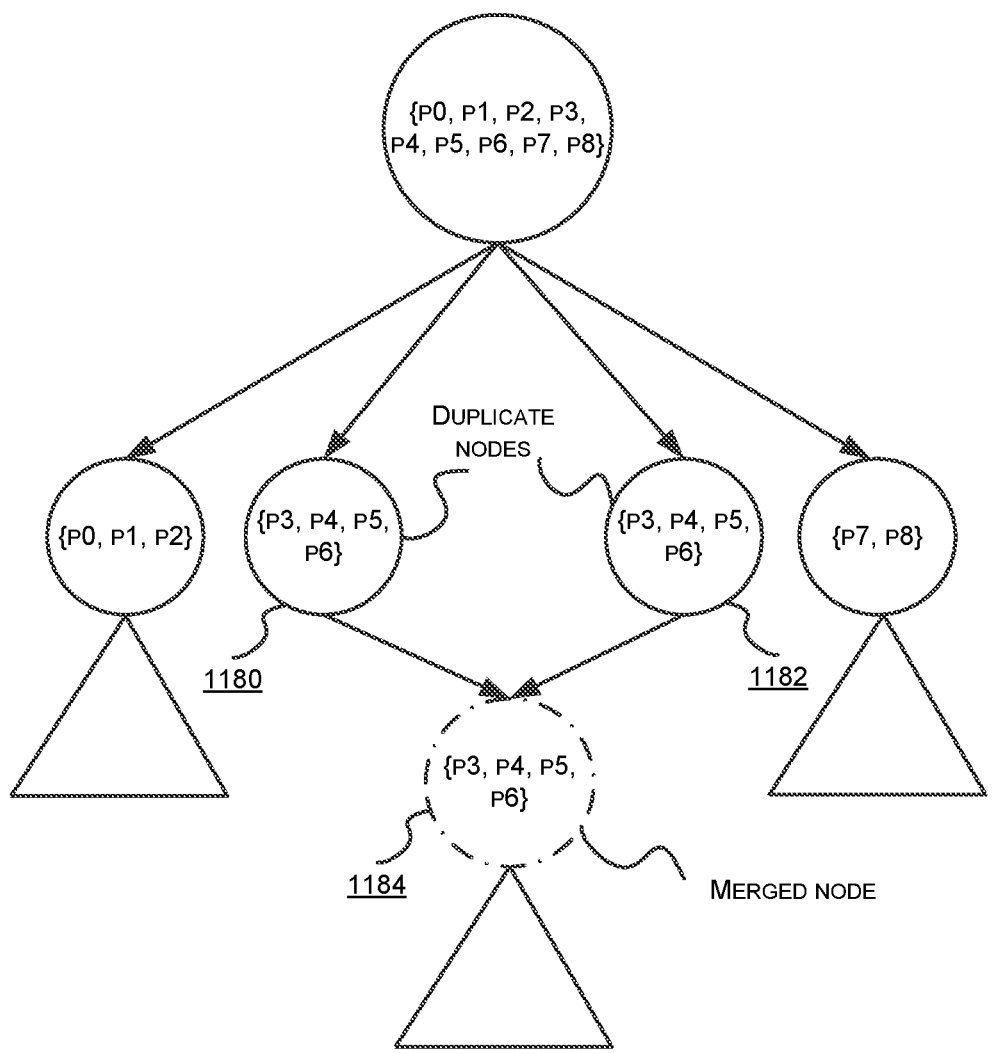
FIG. 11G illustrates an instance of a merge algorithm used by a PSP to reduce compilation memory and avoid node explosion in accordance with an embodiment of the present invention.

FIG. 11G illustrates an instance of a merge algorithm used by a PSP to reduce compilation memory and avoid node explosion in accordance with an embodiment of the present invention.

As illustrated, a PSP compiler of the PSE disclosed can use a merge algorithm to reduce compilation memory and avoid node explosion. A node 1180 can have policies p3, p4, p5 and p6. Likewise, another node 1182 can have the same policies p3, p4, p5 and p6. Using the merge algorithm, the PSP compiler can merge nodes 1180 and 1182 into a node 1184 having policies p3, p4, p5 and p6. In this manner, the number of nodes to be processed can be substantially reduced.

Figure 12:
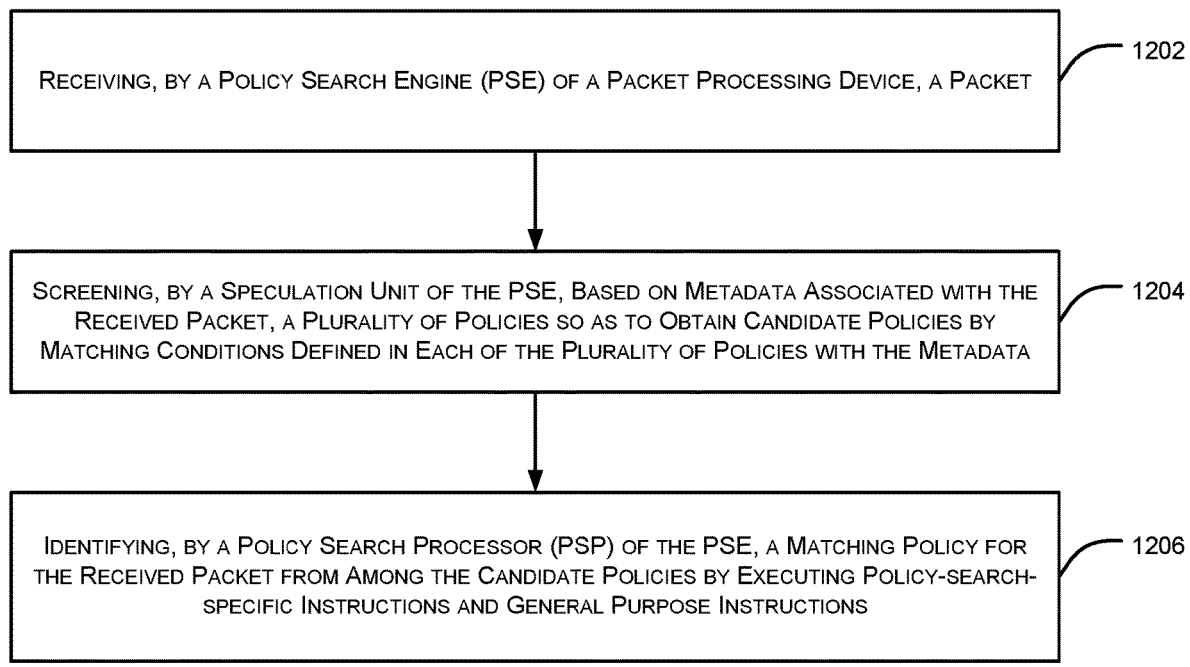
FIG. 12 is a flow diagram illustrating policy search processing in accordance with an embodiment of the present invention.

FIG. 12 is a flow diagram illustrating policy search processing in accordance with an embodiment of the present invention.

In an aspect, a method for policy search processing in accordance with an embodiment of the present invention can include, at step 1202, receiving, by a policy search engine (PSE) of a packet processing device, a packet.

The method can further include, at step 1204, screening, by a speculation unit of the PSE, based on metadata associated with the received packet, a number of policies so as to obtain candidate policies by matching conditions defined in each of the number of policies with the metadata.

Further, the method can include, at step 1206, identifying, by a policy search processor (PSP) of the PSE, a matching policy for the received packet from among the candidate policies by executing policy-search-specific instructions and general purpose instructions.

Figure 13:
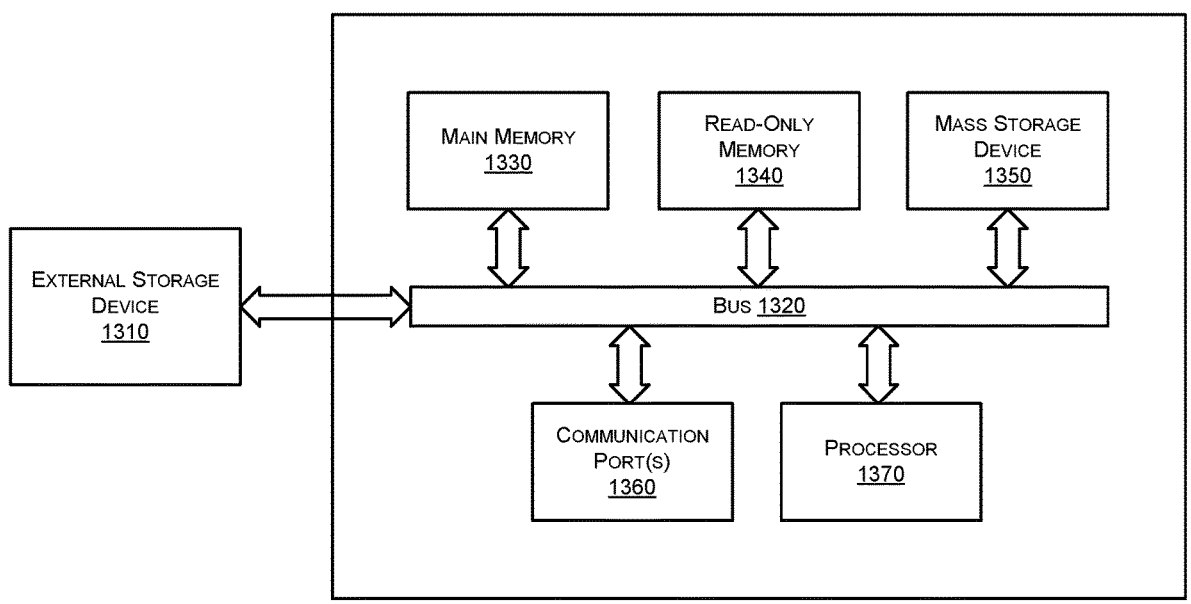
FIG. 13 illustrates an exemplary computer system in which or with which embodiments of the present invention may be utilized.

FIG. 13 illustrates an exemplary computer system 1300 in which or with which embodiments of the present invention may be utilized. Computer system 1300 may represent a packet processing device (e.g., a network security device, such as an IPS, an IDS, an ADC, a firewall, a gateway, a DDoS attack mitigation device and/or a Unified Threat Management (UTM) appliance) or a router) that implements policy search engine 300, 400 or 600.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 1300 includes an external storage device 1310, a bus 1320, a main memory 1330, a read only memory 1340, a mass storage device 1350, communication port 1360, and a processor 1370. A person skilled in the art will appreciate that computer system 1300 may include more than one processor and communication ports. Examples of processor 1370 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1370 may include various modules associated with embodiments of the present invention.

Communication port 1360 can be any of an RS-232 port for use with a modem based dialup connection, a 10/100 Ethernet port, a Gigabit or 10 Gigabit port using copper or fiber, a serial port, a parallel port, or other existing or future ports. Communication port 1360 may be chosen depending on a network, such a Local Area Network (LAN), Wide Area Network (WAN), or any network to which computer system 1300 connects.

Memory 1330 can be Random Access Memory (RAM), or any other dynamic storage device commonly known in the art. Read only memory 1340 can be any static storage device(s) for instance but not limited to, a Programmable Read Only Memory (PROM) chips for storing static information e.g. start-up or BIOS instructions for processor 1370. SANs and VSANs may also be deployed.

Mass storage 1350 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1320 communicatively couples processor(s) 1370 with the other memory, storage and communication blocks. Bus 1320 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1370 to software system. Optionally, operator and administrative interfaces, e.g. a display, keyboard, and a cursor control device, may also be coupled to bus 1320 to support direct operator interaction with computer system 1300. Other operator and administrative interfaces can be provided through network connections connected through communication port 1360.

External storage device 1310 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present invention.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
   building, by a processing resource of a packet processing device, a decision tree to facilitate finding a policy of a plurality of policies that matches a particular packet;
   generating, by the processing resource, a plurality of hash entries within a hash table by performing hash pattern matching for each of a plurality of fields of an n-tuple of a packet received by the packet processing device, wherein the hash table represents conditions expressed by the plurality of policies in n-dimensional space corresponding to the n-tuple;
   identifying, by the processing resource, an entry point to a sub-tree within the decision tree by correlating the plurality of hash entries with a set of candidate policies of the plurality of policies; and
   efficiently identifying, by the processing resource, a matching policy of the plurality of policies by limiting traversal of the decision tree to the sub-tree.

2. The method of claim 1, wherein said performing hash pattern matching comprises for each of the plurality of fields of the n-tuple of the packet:
   constructing a key based on a pattern including a field identifier and a field value of the field; and
   determining a hash entry identifier of the plurality of hash entries by hashing the key.

3. The method of claim 2, wherein the plurality of fields of the n-tuple include a source Internet Protocol (IP) address field, a destination IP address field, a source port, a destination port, and a protocol.

4. The method of claim 1, wherein said efficiently identifying, by the processing resource, a matching policy is performed by executing (i) policy-search-specific instructions that support decision tree traversal and policy evaluation operations and (ii) general purpose instructions.

5. The method of claim 4, wherein the policy-search-specific instructions include instructions that determine an order of cutting of the n-dimensional space.

6. The method of claim 1, wherein the processing resource comprises a co-processor that operates under direction of a general-purpose processor of the packet processing device.

7. The method of claim 1, wherein processing resource comprises a general-purpose processor of the packet processing device.

8. The method of claim 1, wherein the packet processing device comprises a network security device.

9. The method of claim 8, wherein the network security device comprises a unified Threat Management (UTM) appliance.

10. A packet processing device comprising:
    a processing resource; and
    a non-transitory computer-readable medium, coupled to the processing resource, having stored therein instructions that when executed by the processing resource cause the processing resource to:
    build a decision tree to facilitate finding a policy of a plurality of policies that matches a particular packet;
    generate plurality of hash entries within a hash table by performing hash pattern matching for each of a plurality of fields of an n-tuple of a packet received by the packet processing device, wherein the hash table represents conditions expressed by the plurality of policies in n-dimensional space corresponding to the n-tuple;
    identify an entry point to a sub-tree within the decision tree by correlating the plurality of hash entries with a set of candidate policies of the plurality of policies; and
    efficiently identify a matching policy of the plurality of policies by limiting traversal of the decision tree to the sub-tree.

11. The packet processing device of claim 10, wherein said performing hash pattern matching comprises for each of the plurality of fields of the n-tuple of the packet:
    constructing a key based on a pattern including a field identifier and a field value of the field; and
    determining a hash entry identifier of the plurality of hash entries by hashing the key.

12. The packet processing device of claim 11, wherein the plurality of fields of the n-tuple include a source Internet Protocol (IP) address field, a destination IP address field, a source port, a destination port, and a protocol.

13. The packet processing device of claim 10, wherein the matching policy is efficiently identified by executing (i) policy-search-specific instructions that support decision tree traversal and policy evaluation operations and (ii) general purpose instructions.

14. The packet processing device of claim 13, wherein the policy-search-specific instructions include instructions that determine an order of cutting of the n-dimensional space.

15. The packet processing device of claim 10, wherein the processing resource comprises a co-processor that operates under direction of a general-purpose processor of the packet processing device.

16. The packet processing device of claim 10, wherein the processing resource comprises a general-purpose processor.

17. The packet processing device of claim 10, wherein the packet processing device comprises a network security device.

18. The packet processing device of claim 17, wherein the network security device comprises a unified Threat Management (UTM) appliance.

* * * * *